UNITED STATES PATENT OFFICE 2,572,692

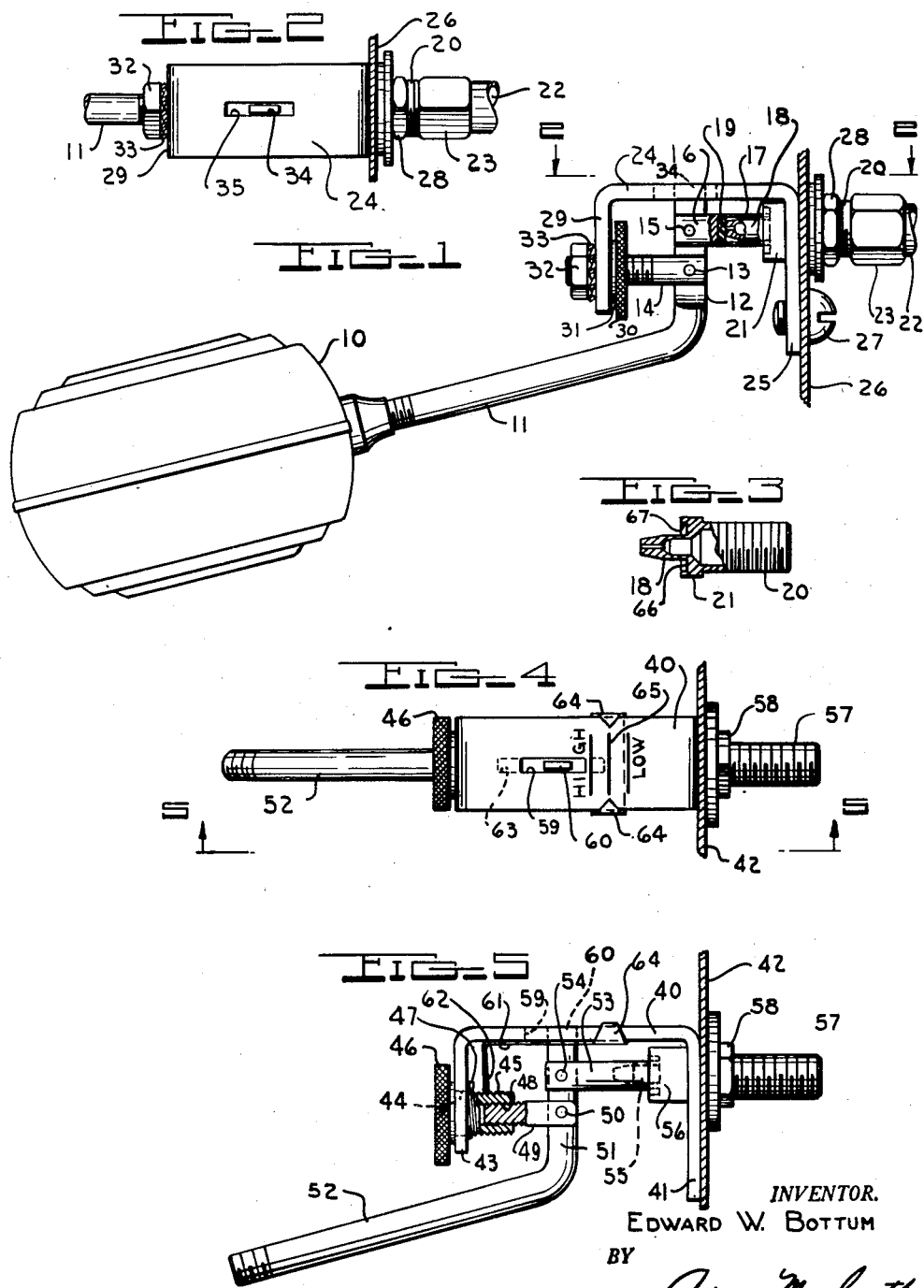

FLOAT CONTROLLED HUMIDIFIER VALVE

Edward W. Bottum, Detroit, Mich., assignor to Skuttle Manufacturing Company, Detroit, Mich., a corporation of Michigan Application September 3, 1947, Serial No. 771,988

2 Claims. (Cl. 137—104)

The present invention relates to improvements in a fluid inlet regulating device and in particular to improvements in a float controlled valve of the type which is particularly but not exclusively useful in humidifier applications.

Conventional practice in regulating the level of a liquid in a reservoir frequently employs a float on the surface of the liquid and operatively connected with a fluid inlet valve for opening or closing thereof in response to the falling or rising of the fluid level. One desirable type of such a float operated valve frequently used in humidifier applications comprises a movable plunger operatively connected with a float for movement relative to the orifice of a fluid inlet jet for closing or opening the latter upon the rising or falling of the float. The float may be in the reservoir itself, but is preferably located in a special float tank in communication with the reservoir.

One of the common difficulties experienced with such valves in humidifier applications is leakage of water around the base of the inlet jet where the latter is secured, usually by a screw-threaded attachment, with an inlet duct. Salts and other impurities in the water collect around the base of the inlet jet where such leakage occurs, and in the course of time result in chemical and electrolytic actions which rapidly corrode the material of the jet, rapidly increasing the leakage and causing costly and troublesome repairs. The corrosive and undesirable impurities which collect around the inlet jet are frequently cleaned therefrom by opening the jet wide to permit a strong flow of fresh incoming water to strike the said plunger and rebound against the jet. Although such practice is efficient in removing the accumulated impurities from the jet, the rebounding spray is undesirable in that it flies for several feet in all directions, necessitating the additional expense of a shield to localize the spray to the region of the jet.

Another difficulty frequently encountered with such valves results from the fluid pressure on the float, which is required to completely close the valve. As the float is lifted by rising of the water level, its upward movement is eventually stopped by the mechanical linkage between the float and the valve mechanism at the position of closure of the jet orifice. A degree of fluid pressure tending to raise the float is important to positively and tightly close the jet orifice and to prevent its leaking. However, the upward force on the float tends to throw the various pivotal linkages connecting it with the valve out of alignment. The delicate lightweight apparatus associated with the valve mechanism is frequently twisted and bent, with resulting and inefficient operation of the entire fluid level control mechanism.

Also, in humidifier applications it is frequently necessary to adjust the operating water level in the humidifier evaporating apparatus according to the operational requirements thereof. In the usual case, this adjustment is effected by adjusting the level of the float member relative to the position of the valve plunger so as to effect a closure of the inlet jet when water in the float tank reaches a desired preselected level. Prior to the present invention, readily accessible and easily operated means for making this adjustment have not been available.

Accordingly, an object of the present invention has been to provide a one piece jet and jet retainer construction for valves of the character described, lowering both the initial and maintenance cost of the valve assembly and providing a leakproof construction at the base of the inlet jet which materially increases the life and service of the jet.

Another object is to provide such a one piece jet and jet retainer construction having an integral spray shield or splash guard for localizing the effect of spray rebounding between the water inlet jet and the plunger therefor when the jet is being cleaned of accumulated corrosive water impurities.

Other objects of the present invention are to provide for valves of the character described, an improved and readily operated float control adjustment means and a simple yet efficient float adjustment indicating means to facilitate adjustment of the float at a desired level and at the position of closure of the inlet jet.

Still another object of the present invention is to provide an improved, economically manufactured, float control fluid inlet regulating mechanism of exceptional sturdiness and simplicity, and which is particularly adapted for holding the pivotal linkages between the float and the valve in proper alignment when the float is buoyed under pressure against the valve shut-off mechanism.

Other objects of this invention will appear in the following description and appended claims, reference being had to the accompanying drawings forming a part of this specification wherein like reference characters designate corresponding parts in the several views.

In the drawings:

Fig. 1 is a fragmentary side view, partly in section, showing a valve and float control mechanism therefor embodying the present invention.

Fig. 2 is a fragmentary top view of a portion of the apparatus shown in Fig. 1, taken in the direction of the arrows essentially along the line 2—2 of Fig. 1.

Fig. 3 is a side view, partially in section, of the one piece jet and jet retainer construction embodying the present invention.

Fig. 4 is a fragmentary top view, partially in section, showing another embodiment of a float controlled fluid inlet regulating mechanism employing the present invention.

Fig. 5 is essentially a fragmentary, partially sectioned side view, taken in the direction of the arrows substantially along the line 5—5 of Fig. 4.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A particular embodiment of the present invention is shown by way of example in the drawings wherein Fig. 1 shows the float 10 secured by a screw-threaded attachment to the float arm 11, which latter provides a flattened upright arm extension 12 to facilitate a pivotal attachment at 13 with the horizontal and adjustable pivot support 14. Above the pivot 13, the flattened arm portion 12 is pivotally connected at 15 with the left end of the valve plunger 16. The right end of the valve plunger 16 provides a tubular structure 17, which is adapted to receive the fluid inlet jet 18 and which provides the jet closure pad 19 at the base thereof. The pad 19 is preferably of rubber or rubberlike material adapted to close the orifice of the jet 18 by pressing thereon.

As shown in Fig. 3, the jet 18 and jet retainer assembly is an integral structure having a duct extended longitudinally therethrough and is preferably fabricated, as by machining for example, from a single piece of bar stock to provide the jet retainer body 20 and the enlarged flange or retaining collar 21, the annular plunger receiving groove 66 within the collar 21, and the annular splash guard 67 projected forward from the periphery of the collar 21 and around the groove 66. For most efficient shielding, the depth of the groove 66 is preferably sufficient to permit the open end of the tubular plunger 17 to project within the coverage of the overhanging guard 67, even when the jet 18 is wide open. However, such a depth for the groove 66 is not absolutely controlling and a shallower groove 66 will perform satisfactorily. The body portion 20 is screw-threaded to permit attachment with a fluid inlet duct 22, as by means of the nut 23. Thus a sturdy economically manufactured unitary jet and jet retainer construction is provided wherein leakage around the base of the jet 18 at its juncture with the collar 21 is absolutely prevented and objectionable spray from the jet 18 is avoided when the latter is open.

A U-bracket 24, Figs. 1 and 2, provides one depending side 25 which is secured to the side of the float tank 26 by a screw or bolt 27. The threaded jet retainer body portion 20 passes through the bracket arm 25 and the side of the float tank 26, to which latter it is secured at a leakproof seal by the nut and washer assembly 28 which draws the collar 21 securely against the inside of the bracket 25.

Various types of float operated fluid inlet control devices are well known to the art. Accordingly, details of the float tank 26 are not shown. The present invention is particularly but not exclusively suited for use in humidifier applications wherein it is desirable to maintain an essentially constant water level in an evaporator pan, not shown, and to permit replacement of water lost by evaporation. Thus the float tank 26, of which only a fragment is shown, is preferably a water tank large enough to contain the float 10 which floats on the surface of the water therein. The float tank 26 may be part of the humidifier evaporator pan itself, or may be directly communicated therewith by an aquaduct which maintains the surface of the water within the evaporator pan and the float tank at the same level. Under ordinary operating conditions, the essentially constant and normal operating water level is determined by the level to which the float 10 must be raised to exert sufficient pressure on the plunger 16 to close the orifice of the jet 18. When the water is below its normal operating level, the jet 18 will be open, even if only slightly. The water level in the tank 26 will thus continue to rise until the normal operating water level is reached and the orifice of the jet 18 is completely closed.

The other depending arm 29 of the U-bracket 24 provides an opening, not shown, which receives the threaded horizontal extension of the pivot support 14 and permits slidable movement thereof longitudinally of its axis. Adjustment of the position of the pivot 13 is permitted by the knurled nut 30, which is screwed on the threaded portion of the pivot support 14 and spaced from the right side of the depending arm 29 by the washer 31, Fig. 1, and the retaining nut 32, which is screwed on the threaded portion of the pivot support 14 on the other side of the bracket arm 29 and spaced therefrom by the lockwasher 33.

The upper tip 34 of the arm 12 extends through a slotted opening or guide slot 35 in the horizontal surface of the U-bracket 24, Fig. 2. The length of the guide slot 35 is adapted to permit operational pivotal movement of the float arm 11 about the pivot 13. The lateral sides of the slot 35 are closely adjacent the opposite sides of the tip 34 to prevent movement thereof parallel to the axis of the pivot 13. Thus is provided a readily available and economically manufactured means for supporting and bracing the arm 11 against lateral movement.

The supporting guide means provided by the slot 35 for the tip 34 becomes particularly important when the water level in the float tank 26 rises and lifts the float 10 to the position at which the plunger pad 19 closes the inlet orifice of the jet 18. In order to effect a complete closure of the said inlet orifice, the buoyance of the rising water on the float 10 must exert considerable pressure.

It is apparent that if the float 10 is maintained in perfect central alignment relative to the longitudinal axis of the float arm 11, the water pressure on the float 10 will result in a purely pivotal action of the float arm 11 about its pivot 13 without causing torsional forces about the longitudinal axis of the pivot support 14. However, if by reason of play in the pivot 13 or its support 14, the float 10 should move laterally, i. e., parallel to the axis of the pivot 13, the buoyancy of the float 10 will tend to rotate the pivot 13 about the longitudinal axis of its support 14. Unless suitable supporting means are provided to counteract this torsional force, the plunger 16 is thrown out of alignment with the jet 18, and proper functioning of the float controlled valve mechanism fails. Thus the arrangement and combination of elements of the present invention avoid the necessity for expensive refinements and precision construction in the pivot 13 and its support 14, and lightweight, economically manufactured parts may be successfully employed.

In operation of the present device, it is apparent that the raising or lowering of the float 10 will correspondingly press the plunger 16 and the pad 19 toward or away from the orifice of the jet 18. When it is desired to clean the jet structure from accumulated water impurities, the plunger 17 is moved to the left to completely clear the pad 19 from the orifice of the jet 18. At this position, the jet will be wide open and a strong flow of inrushing water will strike the adjacent plunger pad 19 and rebound within the tubular walls of the plunger 17, and around the jet 18, and against the base of the groove 66 within the collar 21. By virtue of the overhanging splash guard 67, the water rebounding from the collar 21 is prevented from spraying vertically and laterally out of the float control tank 26. The force of the water is considerably spent by the time the water rebounds from the collar 21, so that the water is directed horizontally and downward into the tank 26 by means of the splash guard 67.

In the arrangement shown, by virtue of the upward extending arm 12 and the horizontal plunger 16 pivotally mounted thereto at 15 above the pivot 13, the horizontal jet 18 will be above the normal operating level of the water within the float tank 26. Accordingly, during times when the water pressure at the inlet duct 22 falls, a siphoning action cannot draw water from the tank 26 in the reverse direction through the jet 18.

Upon loosening the knurled screw 30 and retaining nut 32, the pivot 13 may be horizontally displaced perpendicularly to its axis. Thus the normal level of the float 10 at which the jet 18 is closed by the pad 19 may be raised or lowered. Correspondingly, the normal operating level of the fluid within the tank 26 will be raised or lowered. At all positions of the float arm 11, the tip 34 within its guide slot 35 is adequately and effectively braced against lateral movement and torque tending to rotate the pivot 13 about the longitudinal axis of the support 14.

Figs. 4 and 5 show another embodiment of the present invention wherein a U-bracket 40 provides the depending side portion 41 which may be secured to the side of the float tank 42 similarly to the attachment of the bracket arm 25 to the float tank 26. The depending left arm 43 of the U-bracket 40 provides the opening 44 in which the screw 45 is journaled. The portion of the screw 45 to the right of the bracket arm 43 is externally threaded as shown in Fig. 5. The portion of the screw 45 within the journal hole 44 is preferably smooth to facilitate rotation upon turning the knurled head or handle means 46 which is rigidly secured to the extension of the screw 45 on the left side of the bracket arm 43, Fig. 5. A pin 47 passes through the screw 45 adjacent the inner face of the depending arm 43 to prevent horizontal movement of the screw 45 to the left in Fig. 5. Movement thereof to the right is prevented by the enlarged knurled head 46.

Coaxial with the screw 45 is the internally threaded opening 48 thereof for the screw threaded end of the pivot support 49 which provides the pivot 50 for the upright arm portion 51 of the float arm 52. The plunger 53 is pivotally secured at 54 to the arm portion 51 for horizontal movement toward and away from the orifice of the jet 55 upon the up and down pivotal movement respectively of the float arm 52. Similar to the jet shown in Fig. 3, the jet 55 is preferably integral with the enlarged collar 56 and the screw-threaded jet retaining body portion 57, which latter projects through the side of the float tank 42. The nut 58 screws on the body portion 57 tightly against the side of the float tank 42 and draws the collar 56 securely against the inside of the bracket arm 41.

Also, similar to the guide slot 35, the horizontal portion of the bracket 40 provides the guide slot 59 for the uppermost tip 60 of the arm 51 to prevent movement thereof parallel to the axis of the pivot 50.

An indicating rider 61 has a horizontal portion, parallel and adjacent the underside of the horizontal portion of the bracket 40, and a depending portion 62 which rides within the external threads of the screw 45 for worm driven horizontal movement longitudinally of the screw 45 when the latter is rotated. The horizontal portion of the indicating rider 61 provides the slot 63 for the tip 60, essentially the width of the slot 59 but somewhat longer so as not to interfere with the free movement of the tip 60 regardless of the position of the indicating rider 61. The right end of the indicating rider 61, Fig. 4, extends laterally in either direction to provide the pointed indicating tips 64, which are bent upward and inward over the bracket 40 on either side thereof to secure the indicating rider 61 slidably thereto. Three cross-lines marked on the horizontal surface of the bracket 40 serve to orientate the tips 64. The outer markers 65 are preferably labeled "high" and "low" to facilitate adjustment of the water level in the float tank 42 by providing a visual indication of the existing adjustment of the float position and the direction of adjustment required either to raise or to lower the water level.

The obvious operation of the float controlled valve mechanism is similar to that previously described in connection with Figs. 1, 2, and 3. Simply by turning the knurled screw handle 46, the screw 45 is rotated and the threaded pivot support 49 is moved in the direction of its longitudinal axis by the worm drive engagement between the threaded portion of the pivot support 49 and the internal screw-threaded portion 48. At the same time, the depending arm 62 of the rider 61, in screw-threaded engagement with the external threads of the screw 45, and the pointers 64, are also moved longitudinally of the screw 45 either toward the low or the high marker 65.

It is to be observed that where desired, the pitch of the threaded portion 48 may be small compared to the pitch of the external threaded portion of the screw 45, so that movement of the rider 61 will be magnified relative to the corresponding movement of the pivot support 49.

By the present invention applicant has provided an improved float operated fluid inlet regulating means which provides a sturdy economical construction, a simplified adjustment means for raising or lowering the normal operating fluid level, and means for indicating the existing adjustment of the float position and the direction of regulation required to raise or lower the normal operating level of the fluid.

I claim:

1. In a float controlled fluid inlet control means having a float tank and a float operated member pivotally mounted for pivotal movement with the rising and falling of the water level of the float tank and having a fluid inlet duct communicating with the float tank and an arm operatively coupled with the float operated member for opening and closing said inlet duct upon pivotal falling or rising respectively of the float member, the combination of an adjustable pivot support for pivoting the arm, said pivot support providing a worm screw and a worm drive means rotatably mounted in a stationary portion of said pivot support and in driving engagement with said worm screw, and indicating means for indicating the direction and magnitude of the adjustments of said worm screw relative to said worm drive means and comprising an external screw-threaded portion on said worm drive means and a movable indicator in worm driving engagement with said external threaded portion.

2. In a pivot support for a float controlled fluid inlet control means having a float tank and a float operated member pivotally mounted for pivotal movement with the rising and falling of the water level of the float tank and having a fluid inlet duct communicating with the float tank and an arm operatively coupled with the float operated member for opening or closing said inlet duct upon pivotal falling or rising respectively of the float operated member, the combination of a U-bracket provided with a cross portion and a pair of spaced depending side portions disposed at substantially right angles relative thereto, one of said side portions being secured to a wall of the float tank and having an opening through which the inlet duct is adapted to extend, an adjustable pivot support for pivoting the arm carried by said other depending side portion of said bracket, a guide channel provided in the cross portion of the U-bracket, a guide arm projecting from said float operated member and extending into the guide channel in the cross portion of said bracket to guide the pivotal movement of the float operated member with the rising and falling thereof in the float tank, said pivot support providing a worm screw and a worm drive means rotatably mounted in a stationary portion of said pivot support and in driving engagement with said worm screw and indicating means for indicating the direction and magnitude of the adjustments of said pivot and comprising an external screw-threaded portion on said worm drive means and a movable indicator in worm driving engagement with said external threaded portion and including a portion slidably mounted on said cross portion of said bracket and having an indicating tip adapted to provide a visual indication of the existing adjustments of the pivot support, said worm driving means being supported whereby rotary movement thereof relative to said worm screw and said indicating means effects axial movement of said worm screw and said indicating means relative to said worm driving means.

EDWARD W. BOTTUM.

REFERENCES CITED

The following references are of record in the file of this patent:

UNITED STATES PATENTS

| Number | Name | Date |
|---|---|---|
| 771,686 | Tackaberry | Oct. 4, 1904 |
| 1,858,779 | Ireland | May 17, 1932 |
| 1,952,000 | Skuttle | Mar. 20, 1934 |
| 2,096,051 | MacLean | Oct. 19, 1937 |
| 2,172,647 | Widman | Sept. 12, 1939 |
| 2,263,142 | Pratt | Nov. 18, 1941 |
| 2,292,407 | Skerrit | Aug. 11, 1942 |
| 2,402,488 | Brown | June 18, 1946 |